Aug. 5, 1958  S. M. JOHNSON ET AL  2,846,003
MACHINE FOR CUTTING STRIPS OF RUBBER OR THE LIKE
Filed April 5, 1956  2 Sheets-Sheet 1

INVENTORS
SMITH M. JOHNSON &
JOHN A. FARMWALD
BY Brennan B. West
ATTORNEY

Aug. 5, 1958    S. M. JOHNSON ET AL    2,846,003
MACHINE FOR CUTTING STRIPS OF RUBBER OR THE LIKE
Filed April 5, 1956    2 Sheets-Sheet 2
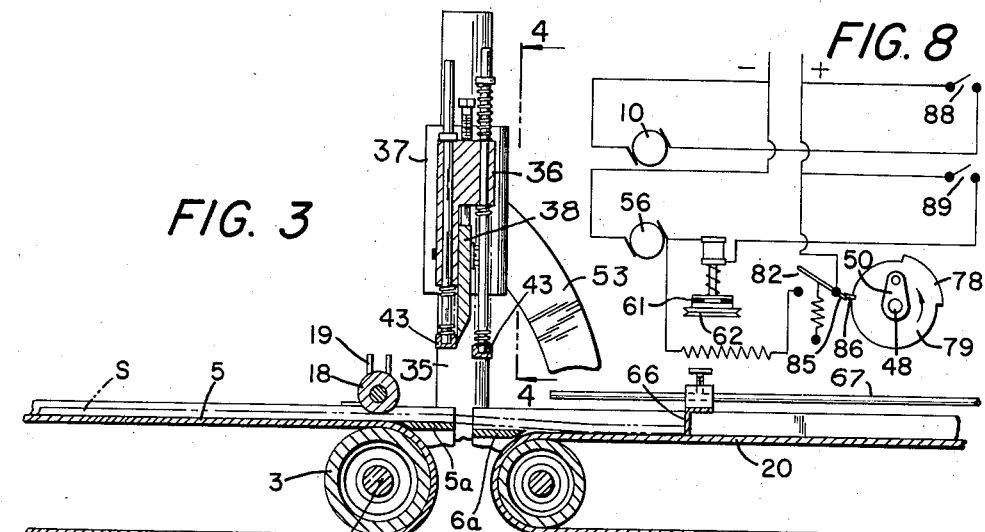
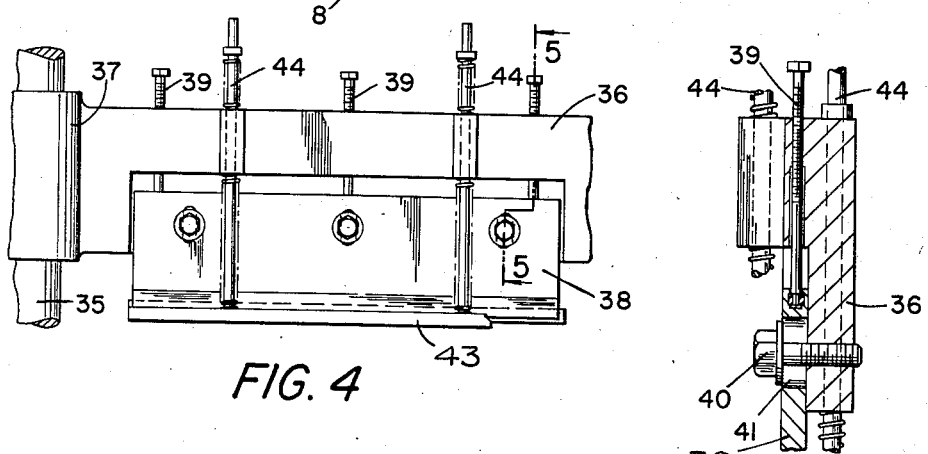
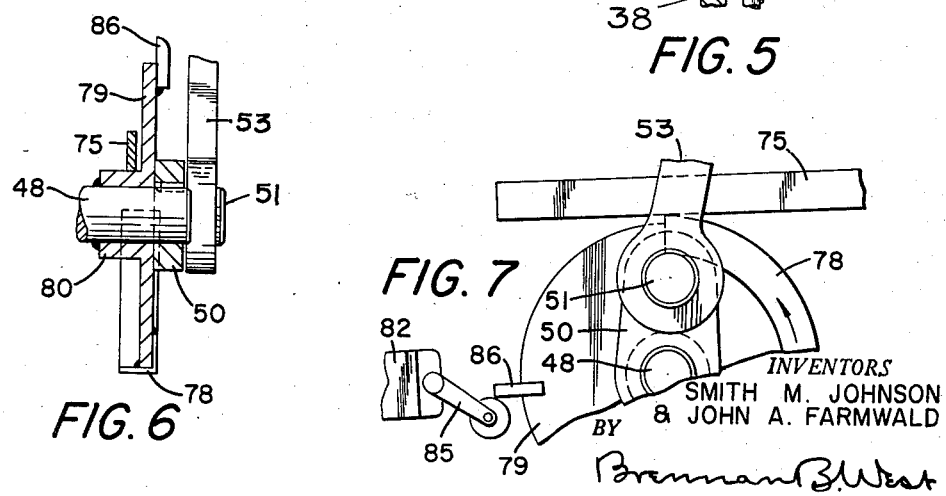
INVENTORS
SMITH M. JOHNSON
& JOHN A. FARMWALD
BY Brennan B. West
ATTORNEY United States Patent Office 2,846,003
Patented Aug. 5, 1958

2,846,003

MACHINE FOR CUTTING STRIPS OF RUBBER OR THE LIKE

Smith M. Johnson, Pawling, N. Y., and John A. Farmwald, Middlefield, Ohio, assignors to The Johnson Rubber Company, Middlefield, Ohio, a corporation of Ohio Application April 5, 1956, Serial No. 576,490

8 Claims. (Cl. 164—48)

This invention relates to machines for cutting strips of rubber or similar material into pieces of desired length, and a rather comprehensive object of the invention is to provide a machine of this class that will simultaneously handle a plurality of strips, cut them accurately into pieces of selected predetermined length, feed said pieces to a receiver or tray, and automatically separate from the pieces of predetermined length, undersize pieces that represent the residue of the strips.

Another object is to provide means for conveniently changing the speed at which the strips are fed relative to the frequency of operation of the cutting mechanism thereby to determine the length of the cut pieces.

Another object is to provide stop means synchronized with the action of the cutting mechanism for lining up the advancing end of the strips and positively suspending movement of the strips during the cutting operation.

A still further object is to provide a machine of the class to which the invention pertains that is of high capacity and yet requires a minimum of attention, the machine being capable of being handled by one attendant.

A still further object of the invention is to provide a machine of the aforesaid class incorporating a power driven reciprocating knife, and in which the knife will automatically stop in "up" position regardless of when, during a cycle of operation, the attendant actuates a manual means for shutting off the power.

Other objects will appear as we proceed to describe the invention more in detail by reference to the accompanying drawings wherein like parts are designated by like reference characters throughout the several views.

Figures 1, 2:
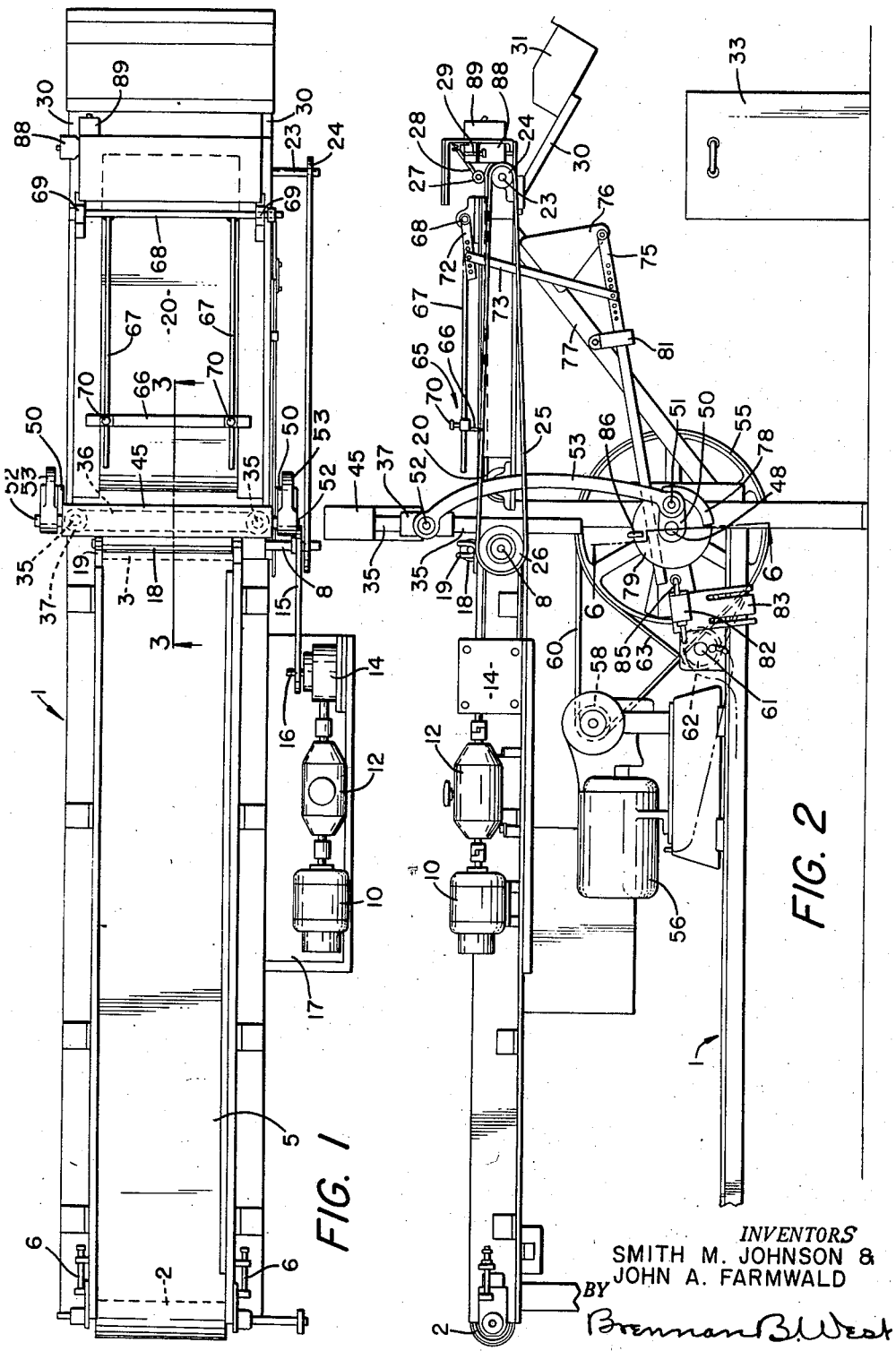
Fig. 1 is a plan view of a cutting machine embodying our improvements.
Fig. 2 is a side elevational view thereof.

Fig. 3, drawn to a larger scale, is a fragmentary vertical longitudinal section through the machine in the region of the cutting mechanism;

Fig. 4 is a detail of the cutting mechanism as viewed from the line 4—4 of Fig. 3;

Fig. 5 is a section substantially on the line 5—5 of Fig. 4, this and the two following detail views being drawn to a further enlarged scale;

Fig. 6 is a section substantially on the line 6—6 of Fig. 2;

Fig. 7 is an elevational view of the parts shown in Fig. 6, viewed from the right, and in the positions they occupy when the shaft is advanced 90° further, and Fig. 8 is a wiring diagram illustrating electric control circuits of the machine.

The frame of the machine is designated generally by the reference numeral 1. Rotatably supported within the top portion of the frame, at about table height, are drums 2 and 3 over which an endless belt conveyor 5 is engaged. This may be termed the feeding conveyor because it feeds the strips to the cutting mechanism. The shafts and bearings for supporting the drums 2 and 3 are of a conventional nature, and operatively associated with the bearings for the shaft of the former drum is adjusting means 6 for tightening the belt conveyor 5.

The shaft 8 whereon the drum 3 is mounted, and with respect to which the drum is fixed, has driving connection with a prime mover 10, consisting of an electric motor. The driving connections between said prime mover 10 and the shaft 8 include a change of speed mechanism 12, reduction gearing contained in a housing 14, and a belt 15 that is engaged over pulleys on the shaft 8 and a shaft 16 that projects from the housing 14. These parts 10, 12 and 14 are shown as mounted upon a shelf 17 that is supported by and extends from one side of the frame 1.

Operating in the vertical plane of the drum 3 is a hold-down roller 18 having trunnions that are guided vertically within bifurcated brackets 19 that are supported by the machine frame beyond the opposite ends of the drum 3. This hold-down roller 18 prevents the strip material from lifting from the conveyor 5 as a cutting operation is performed.

A second belt conveyor 20, termed a delivery conveyor because it carries the cut pieces to a place of removal, is supported by the frame 1 in alignment with and in spaced relation to the feeding conveyor 5. The belt conveyor 20 is engaged about spaced drums that are supported by the machine frame in much the same manner as the drums over which the belt conveyor 5 extends; and the shaft 23 whereon the right hand drum is fixed (as the parts are viewed in Figs. 1 and 2) has fastened to it a pulley 24. A belt 25 is engaged about this pulley and a larger pulley 26 that is carried by and secured to the shaft 8. Thus the conveyor 20 is driven from said shaft 8 at a speed somewhat greater than the speed of the conveyor 5, the conveyor 20 desirably moving about one-third faster than the other conveyor. A hold-down roller 27 is movably connected by arms 28 to the extreme right hand end of the machine frame 1, and said roller is biased by gravity toward the conveyor 20 adjacent the discharge end of the latter. The lower limit of movement of said hold-down roller 27 is determined by contact of said arms with screws, such as the one designated 29 in Fig. 2, which is adjustable with respect to the machine frame.

Supported by laterally spaced brackets 30 that are secured to and are inclined downwardly and outwardly from the end of the frame 1 adjacent the discharge end of the delivery conveyor 20, is a receptacle or tray 31. Cut pieces of predetermined length, as they leave the delivery belt 20, accumulate in the receptacle or tray 31, while undersize pieces that represent the residue of the strips fall through the space between the brackets 30 into a receptacle 33.

Located in a vertical position within the space between the adjacent ends of the conveyors 5 and 20 is the cutting mechanism that is shown more in detail in Figs. 3 to 5. Although this cutting mechanism, of itself, forms no part of the present invention, excepting broadly as a constituent of our improved machine, it may be described briefly as comprising posts 35 that are suitably fastened to and rise from the frame 1 on opposite sides thereof and slidably support a knife bar 36, the latter terminating at its ends in sleeves 37 that traverse the posts 35. Adjustably carried by said bar is a shear blade or knife 38. It is adjustably connected to the bar by screws 39, and is adapted to be securely held to the bar in properly adjusted position by clamping screws 40 that extend through slots 41 in the knife and are threaded into an adjacent part of the knife bar 36. Pressure bars, that are adapted to engage and hold the work during cutting operations, are designated 43, and they are carried by spring plungers 44 that are guided within vertical bores of the knife bar 36. A cover or guard 45 (Figs. 1 and 2) is sustained above and partially about the knife bar by the posts 35.

Suitably supported for rotation a substantial distance below the plane of the conveyors, is a shaft 48. This shaft extends some distance beyond the opposite sides of the machine frame, and a crank 50 is secured to each end of said shaft. Connecting the pins 51 of the cranks 50 with trunnions 52 that extend outwardly from the sleeves 37 of the knife bar 36 are pitmans 53. Accordingly, as the shaft 48 rotates, the knife bar is reciprocated along the posts 35.

A large double face pulley 55, that constitutes a flywheel, is mounted upon and secured to the shaft 48 intermediate the sides of the frame 1. Supported by the frame is a prime mover 56, shown as an electric motor, and the shaft of the same has conventional driving connections with a pulley 58 over which, and the previously mentioned pulley 55 is engaged an endless belt 60. 61 denotes a conventional electrically controlled brake having a pulley 62 over which, and the pulley 55, is engaged a belt 63, the purpose of the brake becoming apparent as this description proceeds.

Stop means designated generally by the reference numeral 65 in Fig. 2 is operatively associated with the delivery conveyor or belt 20. According to the present embodiment it consists of an elongated stop in the form of a cross bar 66 that is mounted upon and adjustable along supporting means or arms 67 carried by a rock shaft 68, journaled in bearings 69 that are mounted upon and secured to the machine frame near the discharge end of the delivery conveyor. The stop or cross bar 66 is adapted to be held against movement with respect to the supporting means or arms 67 by screws 70. Fastened to one end of the rock shaft 68 is an arm 72 to which is adjustably connected one end of a link 73, the other end of said link being similarly connected to a lever 75. One end of the lever 75 is pivoted to a bracket 76 that is carried by a diagonal brace 77 of the machine frame 1, while the opposite or distal end of said lever is in the path of and is adapted to be actuated by a cam 78. Said cam, in the present instance, is made up of an arcuate member that is secured to the edge of a disc 79 and embraces substantially 90° of the circumference of the disc. This cam overhangs the hub 80 (Fig. 6) of the disc and is in the path of the distal end of the lever 75, said lever resting upon the hub of the disc except when lifted therefrom by the cam. The lever is maintained in operative relation with the cam by a guide 81 in the form of a loop that encloses the lever and is pivoted to and suspended from the diagonal brace 77. As a result of this construction, each time the shaft 48, and consequently the cam 78, makes a revolution, the free end of the lever 75 will be lifted and, through the connections above described, lift the stop 66 in synchronism with the reciprocation of the knife.

An electric switch 82 is carried by member 83 that is secured to the machine frame 1 so as to dispose the actuating arm 85 of the switch in the path of a lug 86 that is carried by and extends beyond the edge of the disc 79. The switch 82 is biased to closed position, and upon each rotation of the disc, the lug 86 will engage the actuating arm 85 and open the switch.

As will be seen by reference to Figs. 1 and 2, manually operated electric switches 88 and 89, which may be of the conventional type, are mounted on the machine frame 1 adjacent the discharge end of the delivery conveyor 20, in the general vicinity of which the attendant spends much of his time during machine operation.

As will be seen by reference to the wiring diagram that constitutes Fig. 8 of the drawings, the switch 88 is in circuit with the motor 10. Accordingly, when the switch 88 is closed and said motor is energized, the conveyor belts will be driven so as to carry the strip material through the machine. It will also be observed from the diagram that the switch 89 is in circuit with the motor 56 and with the electromagnetic means of the electrically controlled brake 61 which, when deprived of current, will act automatically to retard rotation of the pulley 55 and consequently will tend to stop operation of the cutting mechanism. The previously mentioned, mechanically actuated switch 82 is in a branch circuit with the motor 56 that is in parallel with the circuit that includes the switch 89. Said branch circuit contains resistance that provides the necessary voltage drop across the brake, in accordance with common expediency. As a consequence of this arrangement, current will continue to be supplied to the motor 56, after the manually operated switch 89 is opened and the electromagnetic means of brake 61 is deenergized, until the actuator 85 of the switch 82 is engaged by the lug 86 on the disc 79 and swung in a direction to open the switch 82. Upon the opening of the switch 82, the cutting mechanism will promptly stop under the influence of the applied brake 61. It will be understood that the circuit arrangement shown in Fig. 8 is illustrative and is not intended as limiting; and in some cases it may be desirable to include additional circuits containing manually operated auxiliary switches located on various parts of the machine so that an attendant may start and stop the conveyors and the cutting mechanism from different positions about the machine.

As evident from the foregoing description, the machine is caused to stop with the knife 38 in elevated or "up" position and with the stop 66 raised. Before starting the machine the attendant places a number of strips of rubber or other material that are to be cut into pieces of predetermined length side by side upon the conveyor 5 with their forward ends generally in the vicinity of the cutting mechanism and with their forward ends beneath the hold-down roller 18. Side guides may be adjustably supported by the machine frame above and along the sides of the feeding conveyor 5, in accordance with common practice. The switch 89 may now be closed to release the brake 61, energize the motor 56, and start the cutting mechanism and the stop means operating in synchronism; and immediately thereafter the switch 88 may be closed to energize the motor 10 and set the conveyor belts in action.

With the machine in operation, the strips of material, indicated in broken lines in Fig. 3 where they are designated S, are fed forwardly by the conveyor 5 beneath the knife and against the stop 66, the stop serving to accurately measure off the length of the pieces to be cut and assuring transverse alignment of their advancing ends. While the movement of the strips is thus momentarily arrested, the knife is lowered by the action of the cranks 50 and shears off the pieces of the strips that extend beyond the knife and lie upon the adjacent end of the delivery conveyor, and as soon as the cam 78 lifts the lever 75, thereby to elevate the stop 66 through the connections previously described, the cut pieces will be released and carried forward at the increased speed of the conveyor 20 and ultimately discharged from said conveyor to the receptacle or tray 31, it being understood that due to the frequency of the synchronized operations of the knife and stop, relative to the speed of the conveyors, several transverse rows of cut pieces may be present on the conveyor 20 at one time.

With reference to the cutting mechanism, it is obvious that, when the knife bar 36 descends, the pressure bars 43 will bear upon the material and hold it down during the cutting operation against plates designated 5a and 6a that are associated with the respective conveyors 5 and 20, and said bars will continue to hold the material down until the knife is withdrawn from cutting position.

As the trailing ends of a batch of strips leave, or are about to leave, the conveyor 5, the machine may be stopped and a fresh supply of strips may be placed upon said conveyor. To stop the machine, the switches 88 and 89 are opened. When the switch 89 is opened, the circuit that includes said switch and the electrically controlled brake 61 is interrupted. However, unless this operation happens to coincide with the engagement of the lug 86 with switch actuator 85, the motor 56 will continue to be supplied with current through the before-mentioned branch circuit and will run until the parts reach the positions shown in Figs. 7 and 8, thereby to insure the knife stopping in "up" position.

Having thus described our invention, what we claim is:

1. In a machine for automatically handling and cutting strips of material into pieces of predetermined length, the combination of a feeding conveyor and a delivery conveyor arranged end to end in spaced relation to each other and by which a plurality of strips, arranged side by side and longitudinally of the conveyors, are adapted to be carried through the machine, a knife supported for vertical movement in the space between said conveyors, elongated stop means supported above and transversely of the delivery conveyor for movement between a first position in the path of the strips and a second position outside said path, mechanism operatively connected to the knife and stop means for raising and lowering the knife and for shifting the stop means between said positions in synchronism, power operated driving means for the conveyors and for the aforesaid mechanism, and an instrumentality for changing the speed at which the conveyors are driven with respect to the frequency of operation of the knife and stop means thereby to vary the length of the pieces being cut, said stop means being adjustable toward and from the knife according to the approximate length of the pieces being cut.

2. In a machine for automatically handling and cutting strips of material into pieces of predetermined length, the combination of a supporting frame, a first belt conveyor and a second belt conveyor supported thereby in end-to-end and spaced apart relation and by which a plurality of strips, arranged side by side and longitudinally of the conveyors, are adapted to be carried through the machine, cutting mechanism incorporating a vertically movable knife that operates within the space between the conveyors, a rock shaft supported by the frame above and transversely of the second conveyor in spaced relation to the cutting mechanism, supporting means carried by said rock shaft and extending along and above the second conveyor, a stop sustained by said supporting means and adjustable therealong toward and from the cutting mechanism, a second shaft rotatably supported by the frame below the plane of the conveyors, operative connections between said second shaft and the knife whereby the knife is caused to descend and rise each time said shaft makes a complete rotation, operative connections between the second shaft and the rock shaft whereby the stop is raised and lowered in synchronism with the movement of the knife, power means for driving the belt conveyors, power means for driving the second shaft, and means for varying the speed of the conveyors with respect to the frequency of reciprocation of the knife.

3. In a machine for automatically handling and cutting strips of material into pieces of predetermined length, the combination of a supporting frame, a first belt conveyor and a second belt conveyor supported thereby in end-to-end and spaced apart relation and by which a plurality of strips, arranged side by side and longitudinally of the conveyors, are adapted to be carried through the machine, the top flight of the second conveyor being slightly below the plane of the corresponding flight of the first conveyor, cutting mechanism incorporating a vertically movable knife that operates within the space between the conveyors, a rock shaft supported by the frame above and transversely of the second conveyor in substantially spaced relation to the cutting mechanism, supporting means carried by said rock shaft and extending along and above the second conveyor toward the cutting mechanism, a stop sustained by said supporting means and adjustable therealong toward and from the cutting mechanism, a second shaft rotatably supported by the frame below the plane of the conveyors, operative connections between said second shaft and the knife whereby the knife is caused to descend and rise each time said shaft makes a complete rotation, operative connections between the second shaft and the rock shaft whereby the stop is raised and lowered in synchronism with the movement of the knife, power means for driving the belt conveyors with the second conveyor operating at a somewhat higher speed than the first conveyor, power means for driving the second shaft, and means for varying the speed of the conveyors with respect to the frequency of reciprocation of the knife.

4. In a machine for automatically handling and cutting strips of material into pieces of predetermined length, the combination of horizontally disposed first and second belt conveyors arranged in substantial alignment and in spaced relation to each other and by which a plurality of strips, arranged side by side and longitudinally of the conveyors, are adapted to be carried through the machine, cutting mechanism including a knife movable up and down in the space between the conveyors, said cutting mechanism including, also, a shaft supported below the plane of the conveyors and transversely thereof, operative connections between the shaft and the knife, a rock shaft supported for oscillation above and transversely of the second conveyor, supporting means secured to the rock shaft and extending along and above the second conveyor, a stop carried by and adjustable along said supporting means, an arm secured to one end of the rock shaft outwardly beyond the side of the conveyor, a lever pivotally supported at one end below said arm and having its distal end adjacent the aforesaid shaft, a cam on the shaft for cooperation with the distal end of the lever, a link operatively connecting the arm and lever, means for driving the conveyors, and further means for driving the first mentioned shaft.

5. In a machine for automatically handling and cutting strips of material into pieces of predetermined length, the combination of a feeding conveyor and a delivery conveyor arranged end to end in spaced relation to each other and by which a plurality of strips, arranged side by side and longitudinally of the conveyors, are adapted to be carried through the machine, a knife supported for vertical movement in the space between said conveyors, stop means supported above the delivery conveyor for movement between a first position in the path of the strips and a second position outside said path, means for driving the conveyors, mechanism for synchronously operating the knife and stop means, said mechanism including a shaft, operative connections between said shaft and the knife whereby the knife is lowered and raised each time the shaft makes a revolution, an electric motor, driving connections between the same and said shaft, a manually operated switch, a first electric circuit including said switch and said motor, a mechanically operated switch that is biased toward closed position and that includes an actuator by which said switch is opened, a second electric circuit in parallel with the former circuit and including said motor and the mechanically operated switch, and a part movable with the shaft, the actuator of the mechanically operated switch being in the path of movement of said part whereby the last mentioned switch will be opened each time the shaft makes a revolution, said part being so related to the shaft that it engages said actuator and opens the switch when the knife is in "up" position.

6. In a machine for automatically handling and cutting strips of material into pieces of predetermined length, the combination of a feeding conveyor and a delivery conveyor arranged end to end in spaced relation to each other and by which a plurality of strips, positioned side by side and longitudinally of the conveyors, are adapted to be carried through the machine, a knife supported for vertical movement in the space between said conveyors, stop means supported above the delivery conveyor for movement between a first position in the path of the strips and a second position outside said path, power means for driving the conveyors, mechanism for synchronously operating the knife and stop means, said mechanism including a shaft, operative connections between said shaft and the knife whereby the knife is lowered and raised each time the shaft makes a revolution, an electric motor, driving connections between the same and said shaft, an electric circuit including said motor and separating beyond the motor into a first branch and a second branch, a mechanically operated switch that is biased toward closed position and that includes an actuator by which said switch is opened, a part movable with the shaft, the actuator of said switch being in the path of movement of said part whereby the switch will be opened each time the shaft makes a revolution, said part being so related to the shaft that it operates said actuator and opens the switch when the knife is in "up" position, a brake biased toward effective condition, an electrical device wherewith the brake is equipped which, when energized, renders the brake ineffective, operative connections between said brake and the shaft, and a manually operated switch, the aforesaid electrical device and said manually operated switch being in said first branch of the electric circuit, said second branch including the mechanically operated switch and being characterized by sufficient resistance to provide the required voltage drop across the electrical device of the brake.

7. In a machine for automatically handling and cutting strips of material into pieces of predetermined length, the combination of parts set forth in claim 4, wherein the end of said link adjacent the arm is adapted to have pivotal connection with the arm at different distances from the axis of the rock shaft.

8. In a machine for automatically handling and cutting strips of material into pieces of predetermined length, the combination of parts set forth in claim 4, wherein the end of said link adjacent the lever is adapted to have pivotal connection with the lever at different distances from the pivotal axis of the latter.

References Cited in the file of this patent

UNITED STATES PATENTS

| | | |
|---|---|---|
| 585,322 | Wallace | June 29, 1897 |
| 1,012,805 | Bryen | Dec. 26, 1911 |
| 1,823,501 | Messinger | Sept. 15, 1931 |
| 2,129,133 | Iben | Sept. 6, 1938 |
| 2,201,581 | Hallden | May 21, 1940 |
| 2,682,344 | Preis et al. | June 29, 1954 |